INVENTOR:
GEORGE V. TRANQUILLITSKY
BY: Joseph B. Gardner
ATTORNEY

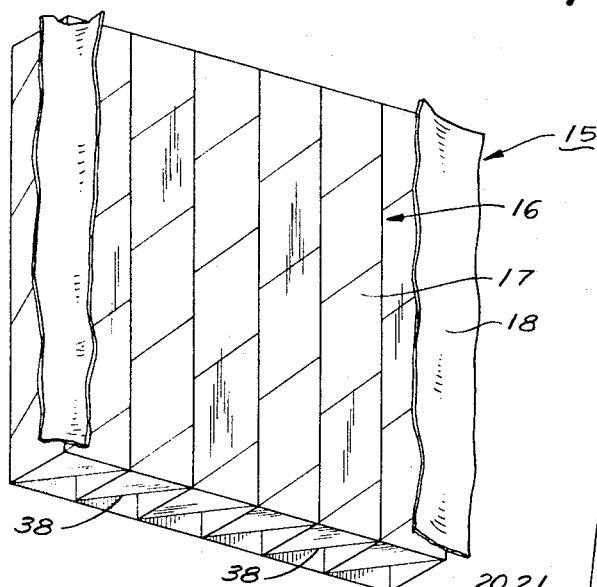
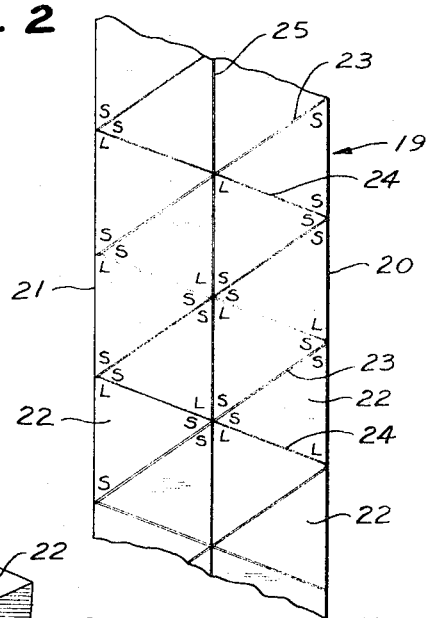
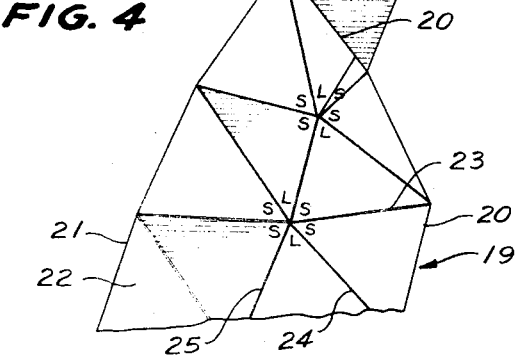

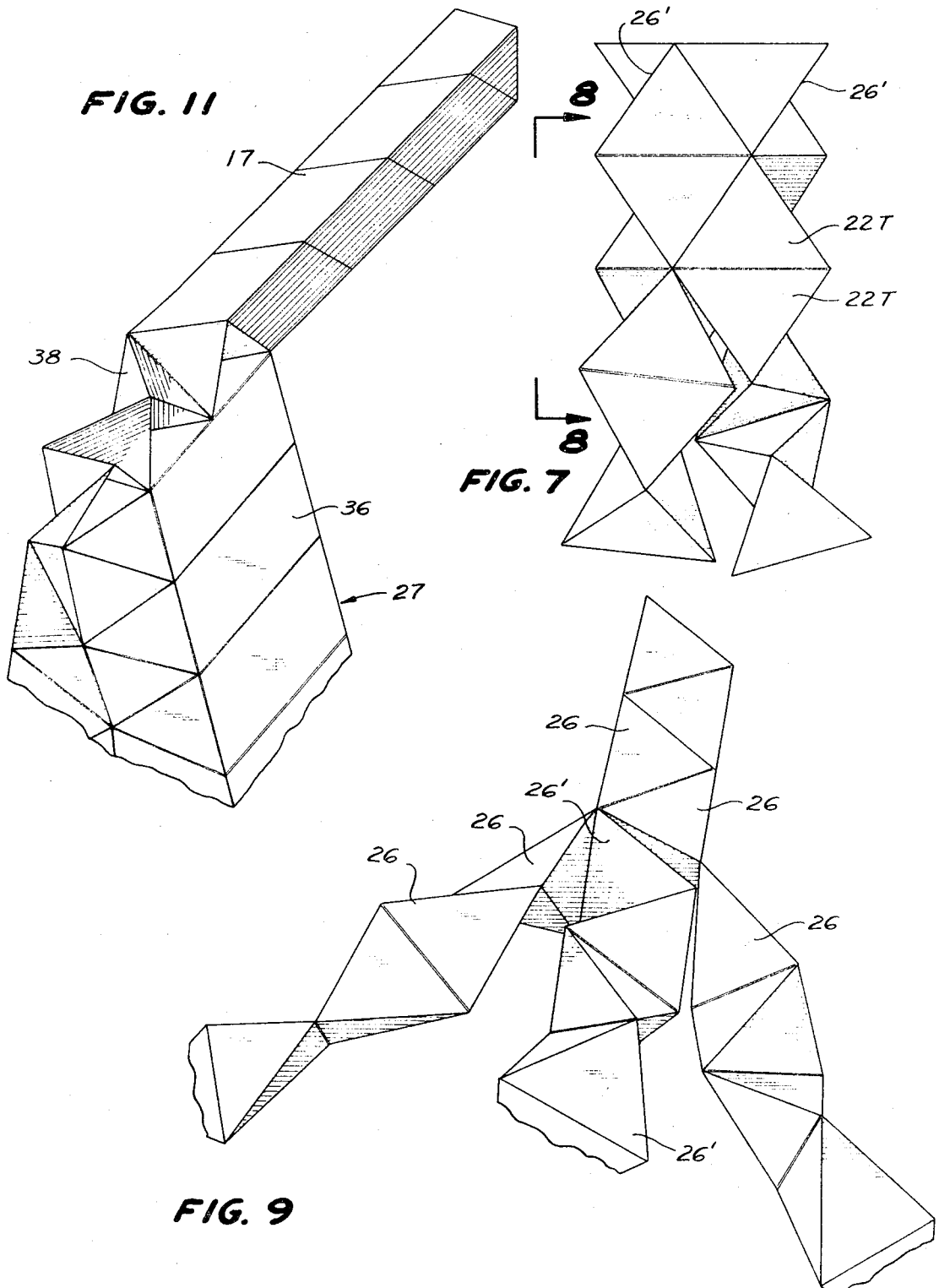

United States Patent Office 3,749,636
Patented July 31, 1973

3,749,636
CELL STRUCTRE OF INTERCONNECTED POLY-
HEDRONS IN PANELS, BEAMS AND OTHER
STRUCTURAL COMPONENTS
George V. Tranquillitsky, 3161 Lynde St.,
Oakland, Calif. 94601
Filed Nov. 20, 1970, Ser. No. 91,384
Int. Cl. B32b 3/12; E04c 2/32
U.S. Cl. 161—37                              10 Claims

ABSTRACT OF THE DISCLOSURE

A cell structure and method of fabricating the same. Cell structures embodying the invention may be used to fabricate panels, beams, and like components having utility in a great number of environments such as in the construction of side, floor and ceiling walls of a building and of material-handling pallets. Any such panel or beam structure comprises a plurality of sub-components or segments each constituted of a number of cells, with all of the segments forming any such panel or beam being connected one with another so as to define a panel or beam having the desired dimensions. Each such segment includes a plurality of cells in the form of substantially closed polyhedrons hingedly connected one with another in a string-like succession thereof; and each such string of polyhedrons is fabricated by scoring a continuous web of flat paper or paper-like material which is then folded along the score lines into a continuous string of interconnected polyhedrons. The folded web is then adhesively or otherwise constrained in the folded condition thereof to maintain the string-like succession of interconnected polyhedrons.

---

This invention relates to cell structures and to a method of fabricating the same, and it relates more particularly to lightweight and inexpensive panels, beams, and similar structural components comprised of such cell structures, and to a method of fabricating such components therefrom. Structural components embodying the invention may be made in a variety of sizes both large and small, and they have utility in a great many environments as, for example, in the construction of building walls and material-handling pallets.

An object of the invention is to provide novel and improved structural components such as panels, beams, and the like having superior strength-to-weight ratios but which components are nevertheless inexpensive, being fabricated from readily available materials that are themselves of low cost.

Another object of the invention is in the provision of a novel and improved method of fabricating cells, string-like segments comprising an interconnected succession thereof, and structural components formed thereof all in a continuous-type process which significantly reduces the cost of construction by affording high speed, volume production using automatic and semi-automatic machinery.

Still another object is that of providing a penal structure, beam, or like structural component and a method of making the same, as heretofore described, in which a long continuous web of planar material is scored to form fold lines thereon and is thereafter folded along such lines into a continuous string of interconnected cell-like polyhedrons each of which is a substantially closed figure, and in which the folded web is then secured in the folded condition thereof to maintain the structural integrity of the string of interconnected polyhedrons.

A further object is to provide an improved structural component and method of fabricating the same in which the continuous individual segments, each comprising a succession of interconnected cells, are cut into proper lengths and then assembled one with another to form a component having any desired dimensional extent.

Yet a further object is in the provision of an improved cell and structural component comprised thereof and to a method of fabricating the same, all of the character heretofore described, in which the continuous webs of material may be paper or the like (ordinary Kraft paper or paperboard, for example), sufficiently stiff to maintain the configurations into which they are folded.

Still a further object is that of providing a structural composition of the type indicated in which the interconnected polyhedrons are tetrahedrons having planar faces, each of which is triangular, wherefore the strength of the web material used in the construction of the continuous strings of polyhedrons is enhanced and augmented by the intersecting edges of the polyhedrons defined by the interconnected faces thereof.

Additional objects and advantages of the invention, especially as concerns particular features and characteristics thereof, will become apparent as the specification continues.

Embodiments of the invention are illustrated in the accompanying drawings, in which:

FIG. 1 is a broken perspective view of a panel embodying the invention;

FIG. 2 is a broken top plan view of a flat blank or web from which a continuous string of interconnected polyhedronal cells is formed, the web being scored to provide fold lines therealong;

FIG. 3 is a broken perspective view illustrating the web shown in FIG. 2 being folded in a first direction to form a string of interconnected polyhedrons;

FIG. 4 is essentially a top plan view, partly in section, of one of the polyhedrons comprising the string thereof illustrated in FIG. 3;

FIG. 5 is a broken perspective view illustrating the web shown in FIG. 2 being folded in a second direction to form a slightly different string of interconnected polyhedrons;

FIG. 6 is essentially a top plan view, partly in section, of one of the polyhedrons comprising the string thereof illustrated in FIG. 5;

FIG. 7 is a broken top plan view showing two strings of polyhedrons of the type illustrated in FIG. 5 being joined in side-by-side relation in the formation of a beam or panel;

FIG. 9 is a broken top plan view, somewhat similar to that of FIG. 7, illustrating two of the strings shown in FIG. 3 and one of the strings shown in FIG. 5 being wound together to form a beam or panel;

FIG. 11 is a broken perspective view showing a scored blank of the type illustrated in FIG 10 being folded to form a structural segment comprising a string of tetrahedrons defined in part by and enclosed within planar sidewalls.

Figure 8:
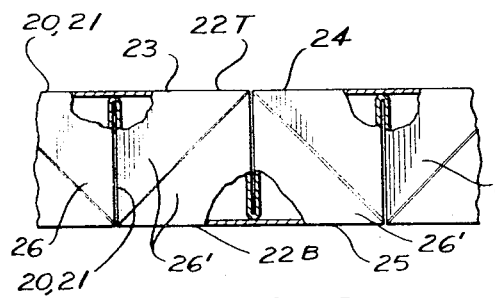
FIG. 8 is for the most part a broken side view in elevation taken generally along the line 8—8 of FIG. 7 but with portions of the structure broken away to illustrate internal characteristics.

Prior to a detailed description of the embodiments of the invention shown in the drawing, it may be observed that panels, beams, and other structural components embodying the invention are strong, lightweight members having utility in many environments as, for example, in residential, commercial and industrial buildings in which the components may be horizontally or vertically disposed and form side, floor and ceiling walls or elements thereof. One exemplary structural component in the form of a panel is shown in FIG. 1, and it is designated in its entirety with the numeral 15. The building panel illustrated includes an inner core 16 comprised of a plurality of panel segments 17 disposed in side-by-side juxtaposition and secured one to another by any suitable means, such as adhesively. In the panel being considered, the core 16 is sandwiched between outer laminations or surface elements 18 which may be adhesively or otherwise secured to the core. As respects the present invention, the laminations or facings 18 may be of any suitable type—rigid, flexible or otherwise—and may be plain or decorated for esthetic purposes, all of which will depend upon the particular use and environment intended for the panel.

The panel segments 17 each include one or more substantially continuous strings of polyhedrons each of which is an essentially closed geometric figure having generally planar faces, and such polyhedrons and the string-like successions thereof are formed from substantially planar webs or blanks which are long and may be withdrawn from large supply rolls for processing in a continuous fabrication operation. A portion of such a web is illustrated in FIG. 2 and is denoted with the numeral 19. The web 19 is constituted of a substantially planar, relatively stiff, bendable material which may take a variety of forms with a particular instance thereof being a relatively tough paper such as heavy Kraft paper or paperboard which may or may not be impregnated or otherwise treated with various substances (a resin plastic, for example) to strengthen the material, provide waterproofing therefor, or otherwise contribute particular characteristics thereto.

The continuous web 19 has substantially parallel longitudinal edges 20 and 21, and it is scored to provide fold lines that define a plurality of polygons 22 on the web which are connected one to another along the fold lines. The polygons 22 are all substantially identical triangles, and the intersecting fold lines defining the same are arranged into a first group constituting a plurality of substantially parallel, longitudinally or axially spaced lines 23 that are angularly disposed so as to incline downwardly and toward the left, as viewed in FIG. 2, and into a second group constituting a plurality of substantially parallel, longitudinally or axially spaced lines 24 which are angularly disposed so as to incline downwardly and toward the right as viewed in FIG. 2. The lines 23 and 24 intersect each other along a center line 25 which is essentially parallel to the longitudinal edges 20 and 21. Accordingly, a plurality of four triangular polygons 22 are defined between any two successive lines 23 or between any two successive lines 24.

The lines 23 and 24 also intersect along the longitudinal edges 20 and 21 of the web 19 and are disposed with respect to such edges so that each line 23 intersecting the same forms one 55° angle therewith, and each line 24 intersecting such edges forms one 70° angle therewith. Accordingly, the included angle defined by any two intersecting lines 23 and 24 is substantially 55°, and it is evident then that each triangular polygon 22 has two 55° angles and one 70° angle. For purposes of identification, the 55° angles in each triangle are denoted with the letter S and each 70° angle thereof is denoted with the letter L. As will become apparent hereinafter, the scored web 19 is folded to form a string of interconnected polyhedrons, and it may be folded so that the successive polyhedrons are interconnected one with another either along an axis or fold line extending between two 55° angles or a fold line extending between one 55° and the 70° angle.

FIG. 3 depicts a scored web 19 being folded in one particular direction to form a substantially continuous string of interconnected polyhedrons 26 each of which is an essentially closed figure having at least one edge portion formed by the junction of non-contiguous surface portions of the web 19 or, specifically, by the junction of the longitudinal edges 20 and 21 thereof. The polyhedrons 26 are interconnected one with another along fold lines extending between one of the 55° angles S and a 70° angle L and, as shown most clearly in FIG. 4, each polyhedron 26 is a tetrahedron in which the four sides thereof are respectively defined by the aforementioned substantially planar polygons 22. The web 19 after being folded to form the string of successive polyhedrons 26 is constrained in its folded condition in any suitable manner, as, for example, by adhesively securing the edge portions 20 and 21 to each other by any conventional means such as adhesives, overlying tape, an overlapping flap joint, etc.

The string of polyhedrons 26 is formed in a continuous process in which a flat web 19 is first scored to provide the fold lines 23, 24, and 25, and is then folded in one predominant angularly direction relative to the longitudinal axis of the web (as shown in FIG. 3) so as to form closed polyhedrons which are joined one to another along a common fold line extending between one 55° angle S and the 70° angle L of the triangular faces adjacent such fold line.

FIG. 5 depicts a scored web 19 being folded in a second particular direction (opposite to the direction of the fold depicted in FIG. 3) to form a substantially continuous string of interconnected polyhedrons 26′ each of which is a substantially closed figure having at least one edge portion formed by the junction of non-contiguous surface portions of the web 19 or, specifically, by junction of the longitudinal edges 20 and 21 thereof. The polyhedrons 26′ are interconnected one with another along fold lines extending between the two 55° angles S and, as shown most clearly in FIG. 6, each polyhedron 26′ is a tetrahedron in which the four sides thereof are respectively defined by the aforementioned substantially planar polygons 22. The web 19 after being folded to form the string of successive polyhedrons 26′ is constrained in its folded condition, as in the case of the string forming the polyhedrons 26. The string of polyhedrons 26′ is constructed in a continuous process, as heretofore described with respect to the string forming the polyhedrons 26.

In fabrication of a panel 15 or core 16 thereof, a plurality of strings of polyhedrons are assembled and the particular manner of assembly and structural composition of the core may vary considerably and, at least to some extent, will depend upon the particular characteristics of the strings being used. FIGS. 7 and 8 illustrate typical assemblages of a plurality of string-like successions of polyhedrons, and in FIG. 7 two substantially identical strings each comprising a succession of polyhedrons 26′ (as shown in FIG. 5) are disposed in side-by-side juxtaposition with the polyhedrons defined by one string nesting within the spaces provided between successive polyhedrons of the juxaposed strings. As a result of such nesting of the polyhedrons of one string within the spaces defined between polyhedrons of the adjacent strings, the opposite faces of the assemblage are essentially planar and substantially parallel to each other.

In this reference, it may be observed that in order to effect such planar faces, the polyhedrons 26′ which are hingedly connected to each other along horizontal fold lines are displaced toward each other (downwardly and inwardly with respect to one pair, and upwardly and inwardly with respect to the next successive pair, as viewed in FIG. 8) so that the top and bottom faces 22T and 22B are in planar juxtaposition. It will be appreciated that the contiguous faces of the polyhedrons 26′ in any one string thereof and the contiguous faces of adjacent strings of polyhedrons may be secured to each other in any appropriate manner, as by means of adhesives.

Another technique for constructing panel segments is shown in FIG. 9, and it constitutes the interconnection of an intertwined configuration of mixed strings of polyhedrons 26 and 26′, respectivey shown in FIGS. 3 and 5. In the particular embodiment shown in FIG. 9, the panel segment is constructed of two strings of polyhedrons 26 and one string of polyhedrons 26', and the strings comprising the polyhedrons 26 are wound about the outer string comprised of the polyhedrons 26'. In this construction, the strings of polyhedrons 26 are each wound in a clockwise rotation about the string of polyhedrons 26', which tends to maintain the configuration shown in FIG. 5 in which the fold lines interconnecting successive polyhedrons are alternately disposed in horizontal and vertical orientations located in common horizontal and vertical planes intersecting each other along the center line of the string. As in the case of the segment formed by the strings of polyhedrons 26' shown in FIG. 7, the opposite top and bottom faces of the panel segment are essentially planar and substantially parallel, thereby forming a segment that is generally rectangular in cross section. It may be noted that a panel segment can be formed by winding two strings of polyhedrons 26, omitting the string of polyhedrons 26'.

Figure 10:
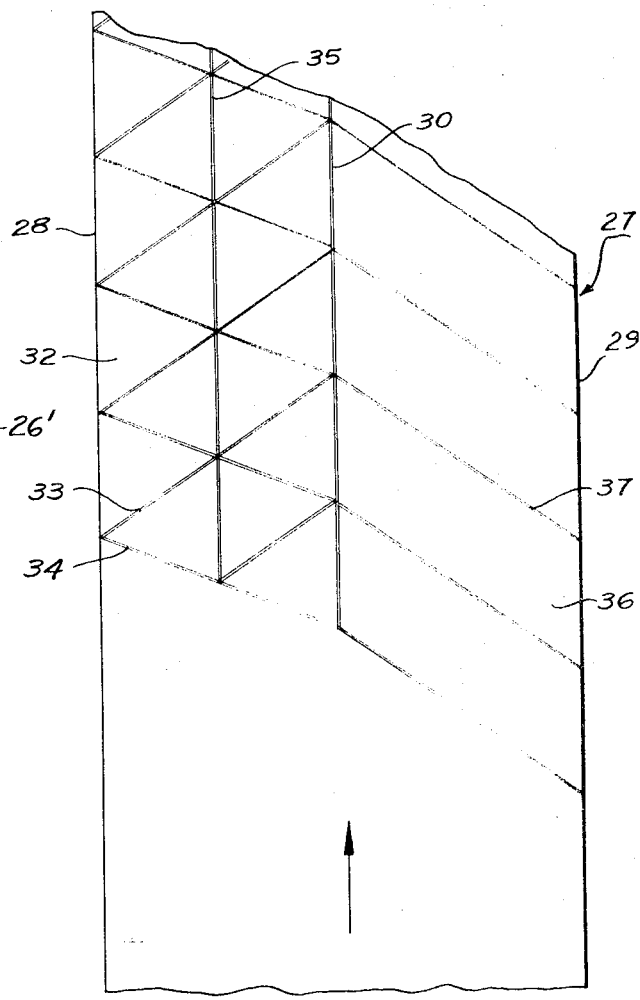
FIG. 10 is a broken top plan view of a modified web or blank diagrammatically illustrating the step of scoring the same.

FIGS. 10 and 11 are concerned with a modified construction used in forming the core 16 and segments thereof illustrated in FIG. 1. The segments 17 are all rectangular in cross section (square-shaped in the particular embodiment be considered), and are fabricated in a single continuous operation involving only one blank or web. Such a web is illustrated in FIG. 10, and referring thereto, the web (which is denoted in its entirety with the numeral 27) is an elongated continuous component, generally rectangular in plan view, and it is composed of two parallel rectangular sections integral with each other and bounded at their outer extremities by parallel longitudinal edges 28 and 29. The web 27 is scored to provide fold lines therealong, and one such line (denoted with the numeral 30) is oriented at the center of the web to divide the same into the aforementioned sections, and such line is substantially parallel to the longitudinal edges 28 and 29.

As in the case of the web 19, the portion of the web 27 defined between the parallel lines 28 and 30 is divided into a plurality of polygons 32 which are all substantially identical triangles and are formed by a plurality of intersecting lines 33 and 34 which cross each other along a center line 35 intermediate the longitudinally extending edges 28 and 30 and substantially parallel thereto. The fold lines 33, 34, and 35 are related to each other and to the longitudinal edges 28 and 30 in precisely the same manner as the arrangement heretofore described with respect to the web 19, and because of this identity, need not be further described.

The web section defined between the edges 29 and 30 is divided into parallelograms 36 by angularly disposed, essentially parallel lines 37 which form continuations of the lines 34 but have a somewhat greater angular disposition with respect to the edges 29 and 30 intersected thereby. The web 27 is scored and folded in a continuous operation and, as shown in FIG. 11, such folding of the web constructs a plurality of polyhedrons 38 which are hingedly interconnected to each other to form a string-like succession thereof in the manner of the polyhedrons 26 and 26', all as described hereinbefore. The polyhedrons 38 are closed geometric figures having four sides so as to define tetrahedrons having substantially planar faces each of which is triangular. Certain of the polyhedrons 38 are closed on one side by the parallelograms 36 which constitute an overwrapping for the string of polyhedrons and establish four planar faces arranged in opposite parallel pairs, as is most evident in FIG. 11. The overwrap formed by the parallelograms 36, which are hingedly connected to each other as well as to the polyhedrons along the fold line 30, may be fixed or held in position by adhesive or any other comparable means.

The segments 17 formed from the planar web 27 are essentially complete, self-sustaining integers that are very firm and rigid, whereas the strings of polyhedrons 26 and 26' formed from the webs 19 are flexible, bendable components with each polyhedron being angularly displaceable relative to those connected thereto along the respectively associated hinge lines therebetween. Accordingly, each of the polyhedron strings 26 and 26' respectively shown in FIGS. 3 and 5 requires integration with other strings (as shown in FIGS. 7 and 8) in order to provide self-sustaining rigidity.

It will be appreciated from the foregoing description that strong, lightweight panels 15 are formed simply and economically in substantially continuous processes in which flat webs are advanced through a succession of stages one of which is a scoring station at which the flat web is scored so as to define fold lines therealong, and the next station of which is the folding station at which the scored web is folded into a string of polyhedrons connected one to another in a continuous succession thereof. The folded webs are secured in their folded condition to maintain the string of interconnected polyhedrons; and in the case of the web 27 and panel segments 17 formed thereby, a complete structural element is constructed which needs no further attention except to be divided into appropriate lengths. In the case of the polyhedrons comprising the strings 26 and 26', they are assembled with like strings, as shown in FIGS. 7 and 9, so as to form self-sustaining panel components. In either case, after appropriate lengths are assembled to form a panel, the assemblage may be covered on one or both sides thereof with outer laminations 18, if this is desired.

It will be apparent that the polyhedrons and strings defined thereby can be reinforced or strengthened in any desired manner as, for example, by impregnating the same, and in certain instances the material used to join adjacent strings and panel segments may contribute to the strength of the panel or, in certain cases, may provide all or most of the structural strength thereof with the adjacent faces of the strings even being spaced apart to define a mold form for an initially flowable material which hardens to furnish the requisite structural strength. In any event, the angular dispositions of the interrelated polyhedrons provide considerable strength much in excess of that which would be expected from the material from which the webs 19 and 28 are formed. Also, the polyhedrons afford excellent thermal insulation because each closed polyhedron defines a dead-air space therewithin which provides considerable inhibition to heat migration therethrough. It will be appreciated, however, that the hollow polyhedrons can be filled with a thermal insulating material (or other material having special features) which would further enhance the insulating characteristics of the panel 15.

From the foregoing description, it will be appreciated that the elemental member in the structural composition is a hollow cell of polyhedronal configuration which, in more particular terms, is a tetrahedron having triangular faces which usually have two included angles of 55° and a third angle of 70°. Such specific angles are not required for the form of the invention illustrated in FIG. 11 in which the succession of polyhedrons is enclosed in an overwrap. The faces of each cell are integral, being formed from a unitary web, and the cells are hingedly interconnected one to another to form a structural segment as, for example, the three divergent segments respectively illustrated in FIGS. 3, 5, and 11. A plurality of individual segments are then joined one with another to fabricate a structural component which may be a beam, panel, or be of any other type.

Figure 12:
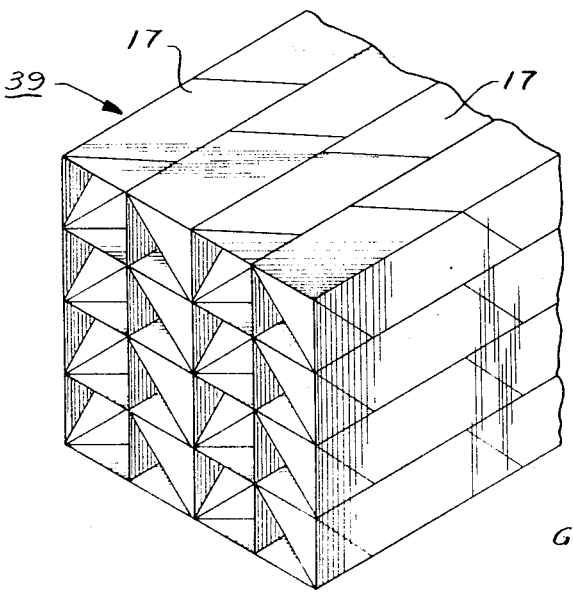
FIG. 12 is a broken perspective view of a beam comprising a plurality of segments of the type shown in FIG. 11.

Structural segments of the type shown in FIG. 11 are self-sustaining and may be used directly as a beam or column. As explained heretofore, such segments may be joined one to another in side-by-side juxtaposition, as shown in FIG. 1, to form a single-layer panel. However, such segments may be joined one to another in multiple layers to form a beam (or column) 39, as illustrated in FIG. 12. Any desired number of such beam-like segments may be united to define a beam having any desired dimensions and, accordingly, any desired strength.

Not only do structural components embodying the invention have an excellent strength-to-weight ratio, but segments comprising a string of interconnected cells have generally equal strength in all directions because of the multidirectional fold lines interconnecting the various faces of any one polyhedronal cell and interconnecting successive cells in the previously described string-like disposition thereof. Accordingly, any structural component comprising a plurality of segments displays generally equal strength in all directions, i.e., generally isotropic. Also, any segment can be made arcuate by slight alteration so as to curve along its length.

Fabrication of the cells, segments, and structural components may be effected in a substantially continuous process, as previously indicated, in which a continuous web of flat, planar material is scored after being withdrawn from a supply roll. The requisite scoring of the web to permit the same to be folded may be of any conventional type, and may include perforating the web or forming lines of weakness therealong, although this technique is not preferred because it evidently detracts from the structural strength of the end product. However, such techniques may be satisfactory depending upon the strength requirements of any particular environment in which a structural component is to be used.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. A structural segment comprising a plurality of tetrahedronal cells disposed one after another in an essentially continuous succession thereof, each of said cells being a substantially closed three-dimensional geometric figure having generally planar triangular face integral one with another and certain of which have adjacent free edges fixedly secured to each other, each of said cells also being integral with those immediately preceding and following the same in such segment-defining succession thereof, and said segment being prior to its formation an elongated generally two-dimensional unitary member having free longitudinal edges and being folded along its longitudinal axis to establish along its length the aforesaid integrality of said faces and successive cells, the aforesaid adjacent free edges of said cells being defined by the free longitudinal edges of said unitary member and being continuous one cell to another and following a generally helical path along the length of said segment.

2. The combination of claim 1 in which said certain interconnected cells are hingedly joined one to another.

3. The combination of claim 1 in which each of said faces is an isosceles triangle.

4. The combination of claim 3 in which each of said triangular faces has two angles each of which is approximately 55°.

5. The combination of claim 4 in which said certain interconnected cells are joined along a line extending between the 55° angles of the triangular faces contiguous therewith.

6. The combination of claim 4 in which said certain interconnected cells are joined along a line extending between one of said 55° angles and the third angle of the triangular faces contiguous therewith.

7. The combination of claim 1 in which a plurality of said segments are joined one to another in facing relation.

8. The combination of claim 7 in which said plurality of segments are disposed in side-by-side juxtaposition with the cells of one segment nesting within the spaces provided between successive cells of the juxtaposed segment.

9. A structural segment comprising a plurality of tetrahedronal cells disposed one after another in an essentially continuous succession thereof, each of said cells being a substantially closed three-dimensional geometric figure having generally planar triangular faces integral one with another, each of said cells also being integral with those immediately preceding and following the same in such segment-defining succession thereof, and said segment being prior to its formation an elongated generally two-dimensional unitary member having free longitudinal edges and further comprising an overwrap integral with at least a plurality of said cells and enclosing at least a portion of such continuous succession thereof to form an essentially self-sustaining structural segment.

10. The combination of claim 9 in which said overwrapped-equipped segment is substantially rectangular in cross section and in which a plurality of said segments are joined one to another in side-by-side juxtaposition.

References Cited
UNITED STATES PATENTS

| | | | |
|---|---|---|---|
| 3,313,080 | 4/1967 | Gewiss | 52—618 |
| 3,584,400 | 6/1971 | Voges | 35—46 |
| 3,203,144 | 8/1965 | Fuller | 52—615 X |
| 3,143,194 | 8/1964 | Hart | 161—125 X |
| 3,302,321 | 2/1967 | Walker | 161—17 X |
| 3,009,277 | 11/1961 | Scherotto | 161—133 X |
| 1,997,022 | 4/1935 | Stalker | 161—17 UX |
| 2,978,077 | 4/1961 | Wood | 161—7 X |

PHILIP DIER, Primary Examiner

U.S. Cl. X.R.

52—615, 618; 156—204, 257; 161—68, 116, 127, 133, 159